Figures 1, 2:
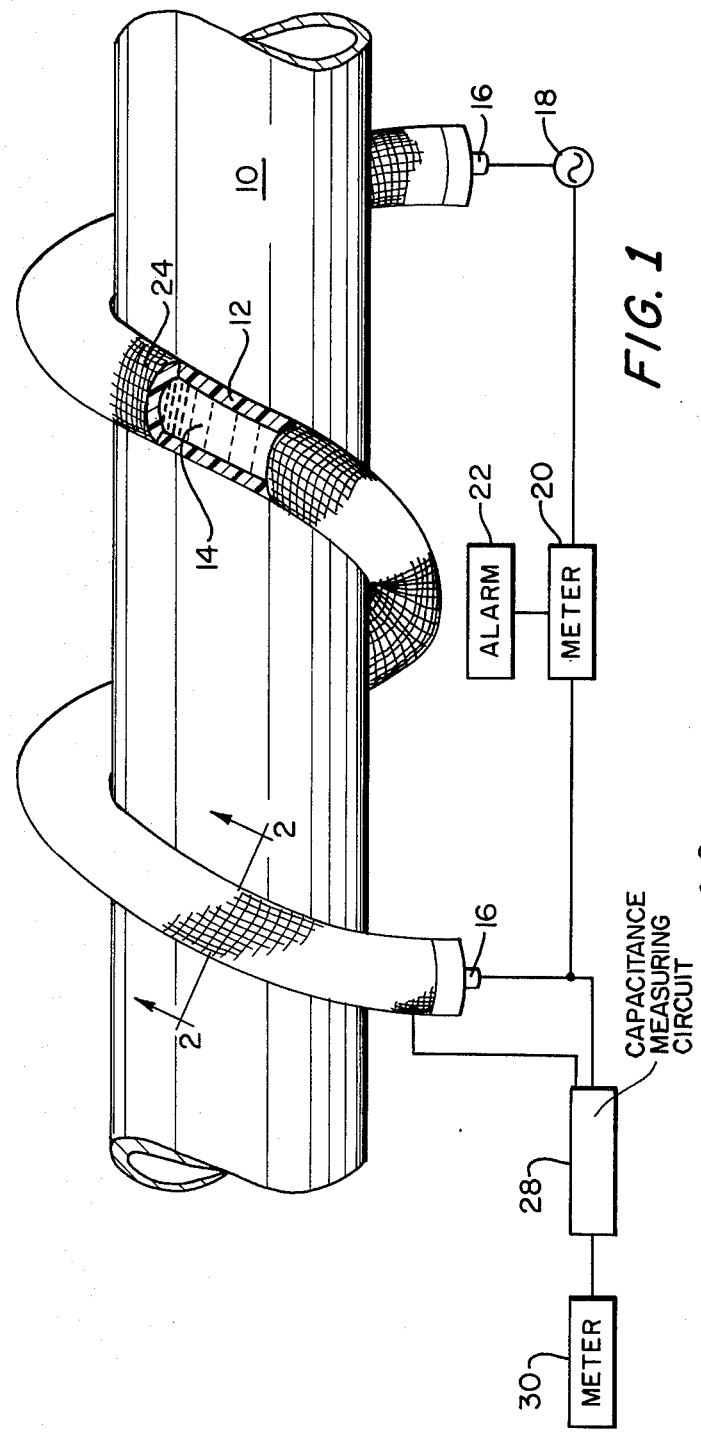

United States Patent [19]

Allan et al.

[11] 4,041,771

[45] Aug. 16, 1977

[54] TEMPERATURE-SENSITIVE DETECTOR

[75] Inventors: Donald S. Allan, Westwood; Daniel Schiff, Framingham Center, both of Mass.

[73] Assignee: Arthur D. Little, Inc., Cambridge, Mass.

[21] Appl. No.: 576,083

[22] Filed: May 9, 1975

[51] Int. Cl.$^2$ .................. G01M 3/18; G01R 31/08
[52] U.S. Cl. .................. 73/40.5 R; 324/52; 340/242
[58] Field of Search ......... 73/15 FD, 17 R, 40.5, 73/40.7; 116/114 P; 138/32; 324/65 R, 52 R; 340/234, 242

[56] References Cited

U.S. PATENT DOCUMENTS

| 2,460,688 | 2/1949 | Gambrill et al. | 324/52 X |
| 2,558,063 | 6/1951 | Seyffert | 324/65 R X |
| 2,820,196 | 1/1958 | Linberg, Jr. | 340/234 |
| 3,214,963 | 11/1965 | Schlumberger et al. | 73/40.7 X |
| 3,273,379 | 9/1966 | Rendos et al. | 73/40.7 |
| 3,316,752 | 5/1967 | Webb | 73/40.5 R |
| 3,510,762 | 5/1970 | Leslie | 324/52 |
| 3,588,689 | 6/1971 | Crawford | 324/52 |
| 3,914,688 | 10/1975 | Lev | 73/342 X |

Primary Examiner—Richard C. Queisser
Assistant Examiner—John S. Appleman
Attorney, Agent, or Firm—Schiller & Pandiscio

[57] ABSTRACT

An improved versatile device which is useful in detecting leaks of cyrogenic material from transporting, storage and processing equipment and for indicating the location of the leaks.

6 Claims, 2 Drawing Figures

TEMPERATURE-SENSITIVE DETECTOR

This invention relates to temperature-sensitive detectors and more particularly to cryogenic leak detectors.

Frequently, materials which exist in a gas phase at normal room temperatures, are transported and stored in their liquid phase at cryogenic temperatures. Within the last decade, the transport and storage of cryogenic materials, and in particular liquid natural gases (LNG) has grown into a major, world wide industry. With the increase of energy consumption and utilization of fossil fuels, these cryogenic materials have been playing an increasingly important role requiring many new liquification plants, terminal facilities, tank trucks, tank vessels and various other transporting processing and storage equipment.

One of the principal problems arising from the handling of these materials is the potential hazards posed by leaks and spills of the materials from the transporting, storing and processing equipment, particularly when the materials are flammable. When a leak or spill occurs, a vapor cloud of flammable gases, such as methane, usually forms and must diffuse through a considerable volume of air before being diluted below its lower flammability limit.

Thus, in order to insure a high level of safety, it is imperative that accidental discharges be detected immediately so that proper action including shutdown, activation of fire protection systems, and the conduct of other cautionary and corrective responses may be initiated.

Many of the known or existing types of detectors which are presently in use are not, however, entirely satisfactory. Some of the commonly employed detectors, such as ionization probes, catalytic cells and thermocouples are, in effect, point sensors that must be strategically placed with respect to the location of potential leaks if they are to detect the leak at all. Since many systems usually have several potential leak sites and since there are economic limitations on the number of detectors that can be employed, detectors usually may be placed some distance from the leak. This tends to prolong the time interval between the occurence of the leak and its detection. Further, although the general location of the leak may be indicated, the exact location of the leak may not always be evident.

Other detection schemes are often employed where the gases are transported and stored in their liquid state. For example, some liquid gas facilities are equipped with suction hoods and air ducts in critical areas. These ducts lead to a gas detector which will initiate an alarm when gas is collected by the system. Gas detectors are also used in strategic locations in various plant areas to detect leaks, both inside and outside of buildings. But, these detectors are also point detectors and thus suffer from the same disadvantages of the point detectors mentioned above. Visual detection can often be made by observing either the condensed water vapor cloud caused by the cool gas lowering the temperature of the surrounding air or by frosting of the liquid line or container caused by the condensation of water vapor on metal surfaces cooled by the escaping cold gas or liquid. Visual inspection requires an alert observer, and thus is not always reliable. Further, a great deal of time can elapse before the leak is detected. Also visual inspection is not possible for detecting leaks in enclosed systems.

It is therefore an object of the present invention to provide an improved detector which overcomes the above-noted disadvantages.

Another object of the present invention is to provide an inexpensive, yet highly reliable leak detector which is easy to assemble and use.

A further object of the present invention is to provide an improved leak detector which is easily adaptable so that it can be placed adjacent to any and all equipment containing cryogenic materials.

Still another object of the present invention is to provide a reliable cryogenic leak detector which will sense and indicate the precise location of any cryogenic leaks from storage and transport equipment in a minimum of time.

These and other objects are achieved by a detector comprising an elongated container which holds a body of material normally in a first phase at ambient temperatures. The body of material is capable of exhibiting a local phase change from the first phase, at a location where the temperature is between ambient temperature and the temperature of the material to be detected. Means are also provided for sensing the phase change and the location thereof in the elongated container.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawing wherein:

FIG. 1 illustrates, in partially schematic and partially longitudinal-sectional view, the preferred embodiment of the present invention; and FIG. 2 shows a cross-sectional view taken along line 2—2 of FIG. 1.

The present invention is an improved device for detecting leaks from containers which carry or hold materials which are normally gaseous under standard conditions (i.e., at a temperature of 273° K and a pressure of 760 torr) and specifically including both cryogens (fluids whose critical temperatures are below normal room temperatures; that is below about 300° K) and refrigerated gases such as ammonia and propane. Thus, referring to FIG. 1, the invention is shown in use with pipe 10 which carries the transported material, although it will be appreciated that the invention can be used with other transporting, storage and processing equipment. The material may be in a liquid or gas phase and is maintained at temperatures which are below the ambient temperatures of the atmosphere surrounding the pipe. For example, the normal boiling point of a material such as methane is 112° K while ambient temperatures might typically be normal room temperatures and thus average around 293° K. Other fluids (e.g., propane and ammonia) may, at times, be maintained in the liquid state by a combination of increased pressure and reduced temperature. In other instances the fluid may be kept in its gaseous state but maintained at a temperature below ambient. At any rate when these fluids are transported through pipe 10, they are maintained at a temperature below the ambient temperature.

The present invention includes a container, which is preferably in the form of an elongated flexible, hollow tube 12, the latter being filled with sensing material 14. Tube 12 is preferably wound around or otherwise disposed in contact with or in close proximity to a substantial portion of the exterior surface of pipe 10. Tubes 12 may be made to have any uniform, cross-sectional shape and preferably has a small internal diameter. For example, a tube having a circular cross-section and having an internal diameter of 0.32 cm is sufficient to carry out the invention. The tube is preferably made of a material which is tough enough to withstand the environmental conditions to which the tube will be exposed, including immersion in the transported material being carried in pipe 10. Further, the tubing material as well as the wall thickness of the tube should be chosen so that adequate heat conduction is provided through the tube wall between the outside of the tube and sensing material 14. The material of which tube 12 is formed is preferably electrically nonconductive. One type of material which has the above characteristics is polyvinyl chloride, although other materials can be used. The flexibility of the tube permits it to be placed along and around any and all types of equipment without affecting the operation of the present invention. Thus, tube 12 can be bent and shaped to assume various configurations depending on the nature and shape of transport or storage containers with which the tube is used. The length of the tube is not critical although the maximum desirable length is dependent on the choice of material utilized as sensing material 14, as will be more evident hereinafter.

The tube is completely filled with homogeneous sensing material 14 so that no other material, such as air, is disposed therein. Material 14 should be compatible with the tube material i.e. will not chemically react with the latter. The sensing material material is of a type which exists in a first phase, preferably liquid, at ambient temperatures, and changes phase, preferably to a solid, at some predetermined temperature which is between ambient temperatures and the temperature of the transported material in pipe 10. Material 14 thus may comprise a single component, but preferably comprises two or more miscible components in which a homogenous chemical composition is maintained through phase change. An advantage in using two or more components is that the freezing point of the material can easily be adjusted by varying the proportions of the various components. For example, a range of freezing points between −60° F and +32° F can be obtained with aqueous chloride solutions by varying the amount of water used. The sensing material preferably is electrically conductive in its liquid phase but exhibits a large change in electrical conductivity when it changes to its solid phase. The desired ratio of conductivity of the material in its liquid phase to the conductivity of the material in its solid phase is dependent on the entire length of tube 12 and the estimated length of the section which changes phase when exposed to a substantial change of temperature due to the transport material in pipe 10. More specifically, the current, Io, passing through the all liquid material 14 can be defined as follows:

$$I_0 = E/R = E s_0 A/L \quad (1)$$

where
  $E$ = the voltage applied between the ends of the tube across material 14;
  $R$ = the resistance of the liquid between the two ends of the tube;
  $s_0$ = conductivity of the material in its liquid phase;
  $A$ = cross sectional area of the tube; and
  $L$ = length of the liquid in the tube.

If a section of the material 14 of length t freezes, the current $I_1$ flowing through the material 14 becomes:

$$I_1 = \frac{E}{R_1 + R_2} = \frac{EA}{(L-t)/s_0 + t/s_1} \quad (2)$$

where
  $E$ = the voltage applied between the ends of the tube across material 14;
  $R_1$ = resistance of the liquid section or sections;
  $R_2$ = resistance of the solid section;
  $s_0$ = conductivity of the material 14 in its liquid phase;
  $s_1$ = conductivity of the material 14 in its solid phase.
  $A$ = cross sectional area of the tube;
  $L$ = length of the liquid in the tube;
  $t$ = length of the solid portion of material 14 in the tube.

The current ratio C of the two currents of equations (1) and (2) becomes:

$$C = \frac{I_0}{I_1} = \frac{s_0}{L}\left[\frac{L-t}{s_0} + \frac{t}{s_1}\right] = 1 + (K-1)\frac{t}{L} \quad (3)$$

where
  $K = s_0/s_1$

By choosing a material where $K >> 1$, the ratio, C can be approximated as:

$$C \simeq 1 + Kt/L \quad (4)$$

Thus, for example, if a current reduction of two is desired, (i.e., C = 2), tube 12 is 100m in length and a minimum frozen section $t$, of 0.1m is provided, solving for K it can be shown that $K \geq 10^3$. One type of material which has a ratio of conductivity of $10^3$ between its liquid and solid phases is aqueous chloride solution.

Each end of the tube is provided with a corresponding one of electrodes 16. Each of the electrodes is at least partially immersed at one end of material 14 and thus is made of a material which is chemically compatible with material 14. For example, where material 14 is an aqueous chloride solution, electrodes 16 can be silver. The electrodes also must be able to withstand the environmental conditions to which they will be subjected. The particular structure of the electrode is well known in the art and thus will not be described in great detail. The electrode should be constructed so that it can be reliably and easily sealed to the end of the tube so that none of material 14 will leak therefrom and so that no foreign substance can be introduced into the tube. The ends of the tube should be mounted in such a manner or protecteed so that the electrodes are electrically insulated from ground.

In order to provide electrical current to both electrodes, and to detect a change in current through the material 14, the electrodes are electrically connected in series to voltage source 18 which preferably provides an AC voltage signal since the latter prevents polarization from occurring at the electrodes. Current meter 20 provides a measure of current through the material 14 so that a change in current through material 14 will be indicated on the meter. Alarm system 22 can be provided and connected to meter 20 to indicate an alarm signal when the current measured by meter 20 falls below a threshold or predetermined minimum value. The AC voltage source 18, meter 20, and alarm system 22, which are all properly grounded, are well known in the art and thus will not be described in detail.

In order to determine the location of any local change in phase of material 14 in tube 12, means are provided in the form of open circuit fault detector. The detector comprises an electrically conductive tubular sheath 24 which is coaxially mounted around and extends along the length of tube 12, (see FIG. 2). Sheath 24 is in one form a flexible electrically-conductive mesh or netting so that it can be bent with tube 12 without affecting the operation of the device. Sheath 24 forms a capacitor with material 14 the material of the tube 12 being the capacitor dielectric. Impedance measuring circuit 28 of known structure is connected at one end of tube 12 electrically between member 24 and material 14 through electrode 16. Means for indicating the value of the impedance, and more particularly the capacitance measured by circuit 28, such as meter 30 may be provided. As is well known in the art, the measure of impedance and more particularly the capacitance, measured by circuit 28 and indicated on meter 30 is proportional to the length of the liquid in the tube which exists between the end of the tube connected to the circuit 28 and any electrical discontinuity. The latter is provided by either the closest liquid - solid interface of material 14 or the other end of the tube if no liquid-solid discontinuity exists.

In operation tube 12 containing material 14 is placed with the surrounding tubular sheath 24 along or around any container, such as pipe 10, which is used to transport or store cryogenic materials. During normal operating conditions the material in tube 12 will remain in its first phase, e.g. liquid; and the resistance throughout material 14 will be substantially uniform so that the current measured by current meter 20 and the capacitance measured by circuit 28 and indicated on meter 30 will be substantially at the reference values. When a leak occurs from pipe 10, the temperature at the location of the leak will ultimately change sufficiently to cause a change in phase of the material 14 in tube 12 at a location approximately where the leak has occurred, i.e. a local freeze. The local freeze causes a local change in conductivity so that a smaller current flows through material 14. This smaller current will be indicated on meter 20 and can be used to trigger alarm circuit 22. At the same time, the capacitance measured by circuit 28 and indicated on meter 30 will change to a value which is proportional to the length of the liquid from the end of the tube which is connected to the capacitance measuring circuit to the location of the frozen portion of material 14. By correlating this change in value of capacitance with the reference value of the capacitance when the entire tube is liquid, the location of the leak can readily be determined.

If tube 12 should rupture, break or leak, a discontinuity would be created in the tube. This discontinuity would be of substantially greater resistance than the discontinuity created by the local phase change of the material 14. Thus, the current transmitted through the material would drop to substantially zero when the leak in tube 12 occurred. In order to insure that such a discontinuity will occur, material 14 can be slightly pressurized, so that under normal operation, circuit continuity is assured, while under conditions where there is a leak in tube 12, a circuit discontinuity is assured.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A leak detector for a first container adapted for holding a first body of material at temperatures which are different from ambient temperature, said detector comprising in combination:
    an elongated tube of an electrically nonconductive material, said tube being adapted to be distributed along the exterior of said first container;
    a second body of a second material in said tube, said second body being normally of a first electrical conductivity in a first phase at ambient temperature and capable of exhibiting at a predetermined temperature between said ambient temperature and said temperatures of said first body of material, a local change in phase and electrical conductivity between said first phase and a second phase at a location where said predetermined temperature occurs; and
    means for sensing the location of said local change in phase in said elongated tube, said means for sensing comprising elongated electrically-conductive means disposed along said tube and means for measuring from one end of said tube, the electrical capacitance between said elongated electrically-conductive means and said second material.

2. A leak detector in accordance with claim 1, wherein said first phase of said second material is a liquid phase and said second phase is solid phase.

3. A leak detector in accordance with claim 2, wherein the freezing temperature of said second material is substantially fixed.

4. A leak detector in accordance with claim 1, wherein said second material is of a first conductivity in said first phase and of a different conductivity in said second phase.

5. A leak detector in accordance with claim 1, wherein said means surrounding said tube comprises an electrically conductive sheath made of a flexible metal mesh material.

6. A leak detector for a first container adapted for holding a first body of material at temperatures which are different from ambient temperature and comprising in combination:
    an elongated container adapted to be distributed along the exterior of said first container;
    a second body of a second material in said elongated container, said second body being normally in a first phase at ambient temperature and capable of exhibiting at a predetermined temperature between said ambient temperature and said temperatures of said first body of material, a local phase change between said first phase and a second phase at a location where said predetermined temperature occurs, said second body comprising two or more components, one of said components exhibiting, per se at a first temperature different than said predetermined temperature, the same change of phase as said local phase change, the other of said components exhibiting per se at a second temperature different from said predetermined temperature the same change of phase as said local phase change, said components being miscible with one another so that a homogenous chemical composition is maintained through said phase change; and means for sensing the location of said local phase change in said elongated container, said means for sensing comprising an elongated electrically-conductive sheath disposed along said tube and means for measuring from one end of said tube, the capacitance between said elongated electrically conductive sheath and said second material.

* * * * *